Sept. 11, 1951 H. E. BALSIGER 2,567,360
MEASURING DEVICE
Filed Sept. 11, 1947
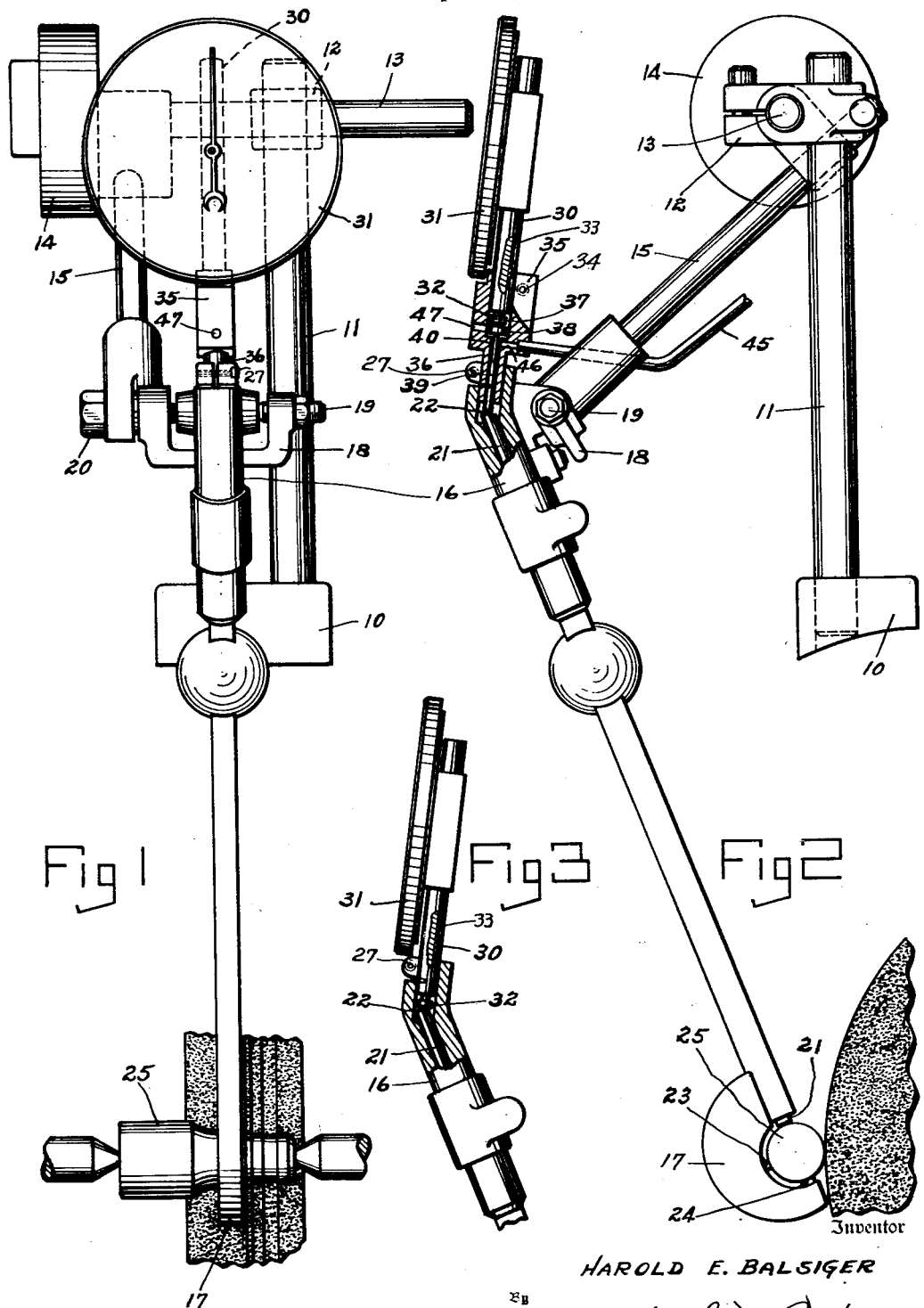
Inventor
HAROLD E. BALSIGER
Attorney Patented Sept. 11, 1951

2,567,360

UNITED STATES PATENT OFFICE 2,567,360

MEASURING DEVICE

Harold E. Balsiger, Waynesboro, Pa., assignor to Landis Tool Company, Waynesboro, Pa.

Application September 11, 1947, Serial No. 773,388

7 Claims. (Cl. 33—172)

This invention relates to size control mechanisms for machine tools, particularly for grinding machines.

Previous visual size control devices utilized an arm or other connection from the caliper feeler member which actuated a size control device while the feeler itself actuated a visual indicator.

An object of this invention is to provide a visual size control device in which the size control member acts as a connecting element between the work engaging member and the visual indicator.

A further object is to provide a visual size control device which may be removably mounted in a standard indicator and caliper combination.

Another object is to provide a visual size control device in which the indicator serves as a precision means for making adjustments for a change of size.

For the purpose of illustration the size control member is shown as being of the pneumatic or hydraulic type and is used preferably in connection with a pressure operated switch of the type disclosed in Patent No. 2,023,777 granted and others. However, the size control member may be electrical or mechanical.

In the drawings:

Figure 1 is a front elevation of the device.

Figure 2 is an end elevation partly in section to show the relation between the principal elements.

Figure 3 is a partial end elevation of a conventional visual indicator.

Numeral 10 indicates a portion of a machine tool, in this case a grinding machine. Specifically, the portion indicated by numeral 10 is a part of the wheel base. An upright support member 11 is rigidly mounted in said wheel base. Attached to said member 11 by means of bracket 12 and shaft 13 is a damping device 14. An arm 15 extends from said damper to support the housing 16 of caliper 17. Said arm 15 is pivotally attached to a bracket 18 by means of screws 19 and 20.

Caliper housing 16 encloses an elongated feeler member 21, one end of which serves as the movable work contacting member. The other end extends slightly into a recessed portion 22 in the upper end of housing 16. The other fixed members 23 and 24 are angularly spaced in the conventional caliper frame 17 as shown in Figure 2, in operative engagement with a work piece 25.

As shown in Figure 3, in the standard visual gauge, the recess 22 accommodates the staff 30 of an indicator 31. The feeler 32 for actuating said indicator extends through said staff and engages the movable member 21. Said feeler is held in contact with member 21 by indicator spring 33.

Figure 2 shows how the indicator may be removed from recess 22 and be replaced by a valve housing 35 having a cylindrical portion 36 the same diameter as staff 30 for insertion in recess 22. Said valve housing has a bore 37 for receiving staff 30 of indicator 31. Staff 30 may be clamped in bore 37 by screw 34. A valve member 38 is slidably mounted in said bore and engages the feeler 32 of said indicator. Said valve has a stem 39 which passes through a smaller bore 40 in said cylindrical portion 36 to contact the work engaging member 21 of caliper 17. Fluid under pressure may be introduced into said valve from line 45 through port 46 and may pass out of said valve through port 47 at a rate depending upon the position of valve 38.

Change in diameter of the work piece 25 results in movement of valve 38 by indicator feeler 32 to reduce the flow of fluid through port 47. The resulting increase in pressure may be used to control the operation of a machine as disclosed in Patent No. 2,023,777 referred to above.

In case it is desired to have the size control function for a different size the valve housing 35 and indicator may be adjusted by releasing the clamping screw 27 in the housing 16 and shifting the portion 36 in recess 22. Feeler 21, valve 38 and indicator feeler 32 remain stationary. Port 47 and indicator 31 move relative to valve 38 until the flow of fluid therethrough is reduced to a predetermined point and the machine controls are actuated. The extent of this movement is shown by the indicator. Without further adjustment of said indicator, another piece may be ground and when the indicator shows zero, the diameter of the work piece will vary from that of previous pieces by the amount of said adjustment.

I claim:

1. In a sizing device of the type which uses fluid under pressure to actuate electrical contacts, a caliper for engaging a work piece, a movable feeler member in said caliper, an indicating device to show the extent of movement of said feeler, a means connecting said feeler and said indicator including a valve housing having spaced inlet and exhaust ports, a valve in said housing having a stem engaging said feeler and a head portion in contact with said indicator, said valve being actuated by said feeler member in response to a change in the size of a work piece for changing the rate of flow of said fluid under pressure, means for adjusting the relative axial position of said valve and said ports, said indicator serving to show the extent of said adjustment.

2. In a sizing device of the type which uses fluid under pressure to actuate electrical contacts a caliper member having a work engaging portion at the lower end thereof, a work engaging feeler slidably mounted in said caliper member, the upper end of said member being recessed to receive the stem of a dial indicator, a valve including a housing having a hollow stem portion for insertion into the recess in said caliper member, said housing also having a recess for receiving the stem of said dial indicator, spaced inlet and exhaust ports in said recess, a valve member in said valve housing for controlling the flow of fluid therethrough and having a head in said recess and a stem passing through said hollow portion into contact with said feeler member, a supply of fluid under pressure connected to said valve, said fluid being operable in response to a change in flow due to a change in size of a work piece to change the pressure in said fluid supply, means for effecting axial adjustment of said indicator and said valve housing as a unit relative to said valve member and said caliper to cause a change in setting of said device, said dial indicator showing the extent of said adjustment, said adjustment serving also to reset said dial indicator so that it will read zero when a work piece is ground to the new size.

3. A sizing device including a caliper member having a work engaging portion at the lower end, a work engaging feeler slidably mounted in said caliper member, the upper end of said caliper member being recessed for normally receiving the stem of a dial indicator, a valve including a housing having a hollow stem at one end which is adapted to fit said recess and the other end having a recess for said indicator stem, spaced inlet and exhaust ports in said valve recess, a valve member having a head portion in said recess for controlling the flow of fluid through said ports in response to a change in size of a work piece, said valve member having a stem extending through said valve housing stem to engage said feeler.

4. A caliper type indicator gauge having a work engaging member, a housing therefor, a recess in said housing, a valve body having a portion for insertion into said recess, a similar recess in said valve body for receiving the stem of a dial indicator, spaced ports in said recess, a valve member comprising a headed portion in said recess for controlling the flow of fluid through said ports in response to a change in size of a work piece, and a stem portion extending through said valve body into contact with said work engaging member, said valve body being axially adjustable in said recess for changing the relation of said valve and said ports.

5. In a conventional size indicator having a caliper member, a work engaging member therein, a dial indicator having a feeler normally contacting said work engaging member, means for converting said size indicator into an automatic size control mechanism which consists in a valve body on the caliper member in the place usually occupied by the dial indicator, said valve body having a cylindrical bore into which the stem of a dial indicator may be inserted, and a valve member in said valve body comprising a stem, a head on one end of said stem, said head being in engagement with the feeler of said dial indicator and the said stem being in engagement with the work engaging member.

6. A size indicating device comprising a caliper member having a housing in which a work engaging feeler is slidably mounted, one end of said housing being recessed and a dial indicator mounted in said recess, means for converting said size indicating device to an automatic sizing device which includes a valve body, a supply of fluid under pressure attached thereto, said valve body being mounted for axial adjustment in the recess in said housing, a recess in said valve body for receiving the stem of said dial indicator, spaced ports in said valve body and a valve member slidably mounted in the recess in said valve body said valve member comprising a stem, a head on said stem for controlling the flow of fluid through said body in response to a change in size of a work piece and having said head end engaging the feeler portion of the dial indicator and the other end being in contact with one end of said work engaging feeler.

7. Means for converting a conventional size indicator into an automatic size control mechanism which consists in a size control element on a caliper member in the place usually occupied by the dial indicator, means for mounting a dial indicator on said size control element, a spring in said dial indicator, a movable member in said size control element having operative engagement with the feeler of said dial indicator and also with the work engaging feeler of said caliper, said spring being effective through said size control element for urging said feeler toward the work.

HAROLD E. BALSIGER.

REFERENCES CITED

The following references are of record in the file of this patent:

UNITED STATES PATENTS

| Number | Name | Date |
| --- | --- | --- |
| 1,954,442 | Dall et al. | Apr. 10, 1934 |
| 2,267,559 | Foster | Dec. 23, 1941 |